(12) United States Patent
Tosto

(10) Patent No.: US 9,232,699 B1
(45) Date of Patent: Jan. 12, 2016

(54) TOWABLE LAWN TARP

(71) Applicant: John Tosto, Ramsey, NJ (US)

(72) Inventor: John Tosto, Ramsey, NJ (US)

( * ) Notice: Subject to any disclaimer, the term of this patent is extended or adjusted under 35 U.S.C. 154(b) by 126 days.

(21) Appl. No.: 14/224,196

(22) Filed: Mar. 25, 2014

(51) Int. Cl.
*A01G 1/12* (2006.01)

(52) U.S. Cl.
CPC ........................................ *A01G 1/12* (2013.01)

(58) Field of Classification Search
CPC ....................................................... A01G 1/12
See application file for complete search history.

(56) References Cited

U.S. PATENT DOCUMENTS

| | | | |
|---|---|---|---|
| 3,355,187 A | 11/1967 | Brindle | |
| 3,771,808 A * | 11/1973 | Duerst | B62B 15/00 280/19 |
| 4,173,351 A | 11/1979 | Hetland | |
| 4,283,068 A * | 8/1981 | Keyser | B62B 13/16 224/158 |
| 4,442,557 A * | 4/1984 | Clemens | A61G 1/01 224/158 |
| D287,111 S | 12/1986 | Walker | |
| 5,104,133 A | 4/1992 | Reiner | |
| 5,211,434 A * | 5/1993 | Lanava | B62B 15/00 220/7 |
| 6,565,101 B2 | 5/2003 | Jones, Jr. | |
| 7,785,008 B2 * | 8/2010 | Schoenig | A45C 13/002 294/214 |
| 8,075,185 B2 * | 12/2011 | Hecht | A47G 33/045 280/18 |
| 8,091,937 B2 | 1/2012 | Mastromatto | |
| 8,172,238 B2 * | 5/2012 | Wolf | A61G 1/01 224/158 |
| 8,720,462 B2 * | 5/2014 | Vieira | B25G 1/02 135/118 |
| 8,955,892 B1 * | 2/2015 | Shumate | B62B 15/007 280/19 |
| 2003/0190096 A1 * | 10/2003 | Miodragovic | A45C 9/00 383/4 |
| 2005/0077329 A1 * | 4/2005 | Sconzo | A45F 3/04 224/153 |
| 2005/0252717 A1 * | 11/2005 | Farrah | A63B 21/153 182/3 |
| 2006/0208024 A1 * | 9/2006 | Gleason | A45F 3/08 224/633 |
| 2009/0051131 A1 | 2/2009 | Warrington | |
| 2009/0051132 A1 | 2/2009 | Masterson | |
| 2009/0206118 A1 * | 8/2009 | Sabbah | A45C 13/02 224/652 |
| 2010/0008601 A1 * | 1/2010 | Prudencio | A01G 1/12 383/4 |
| 2013/0292432 A1 * | 11/2013 | Stevens | A45F 3/04 224/184 |

FOREIGN PATENT DOCUMENTS

CA          2617431          6/2009

* cited by examiner

*Primary Examiner* — Brian D Nash
(74) *Attorney, Agent, or Firm* — Kyle A. Fletcher, Esq.

(57) ABSTRACT

The transportation tarp assembly includes a panel that is positionable on a support surface. An object is positionable upon the panel. A belt is provided. The belt is worn by a user. A clip is operationally coupled to the belt. A rope is coupled between the clip and the panel. The user tows the objects on the panel. Once the user arrives at the intended destination, a selected rope is disconnected, and the user walks forward in order for the tarp to flip over thereby dumping the objects at the intended destination.

17 Claims, 4 Drawing Sheets

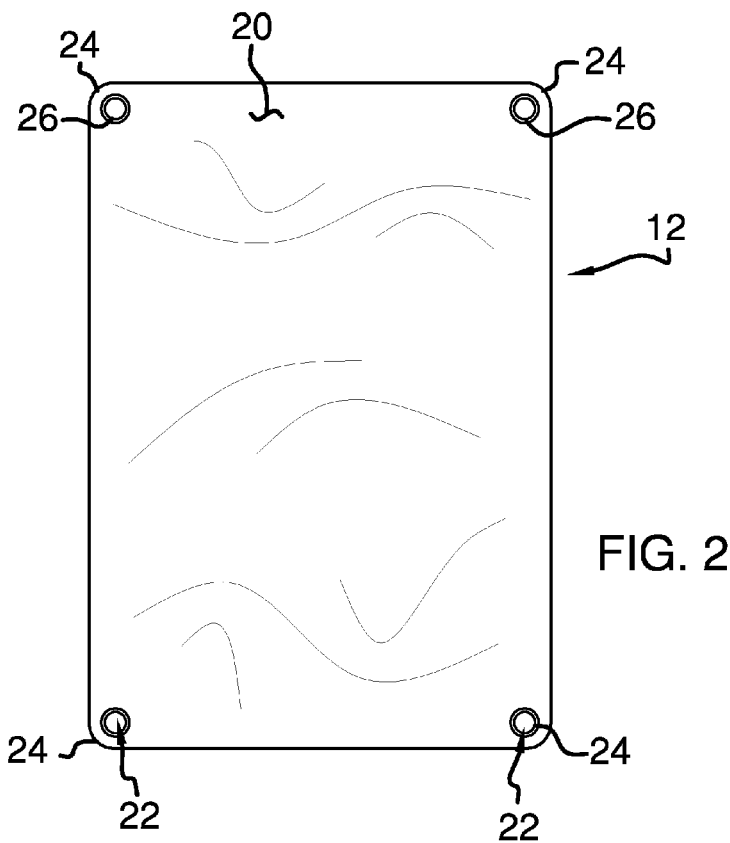
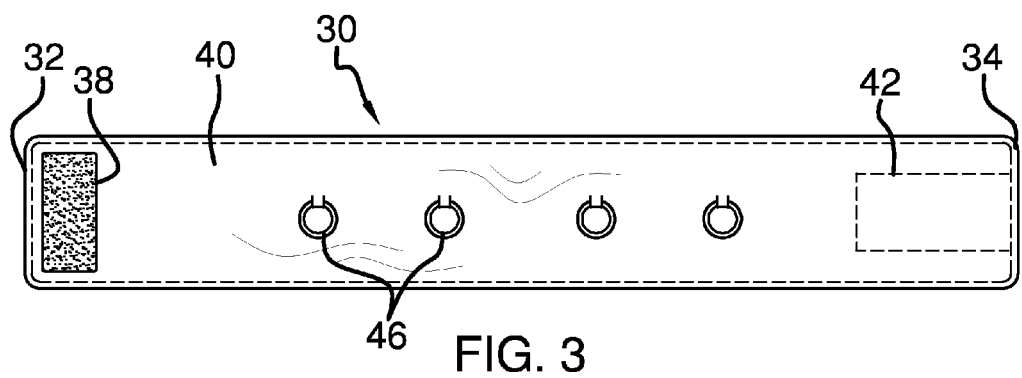

TOWABLE LAWN TARP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of lawn tarps, more specifically, towable lawn tarps.

SUMMARY OF THE INVENTION

An embodiment of the disclosure meets the needs presented above by generally comprising a panel that is positionable on a support surface. An object is positionable upon the panel. A belt is provided. The belt is worn by a user. A clip is operationally coupled to the belt. At least one rope is coupled between the clip and the panel. The user tows the objects on the panel. Once the user arrives at the intended destination, a selected rope is disconnected, and the user walks forward in order for the tarp to flip over thereby dumping the objects at the intended destination.

An object of the invention is to provide a device that is towable lawn tarp.

These together with additional objects, features and advantages of the towable lawn tarp will be readily apparent to those of ordinary skill in the art upon reading the following detailed description of presently preferred, but nonetheless illustrative, embodiments of the towable lawn tarp when taken in conjunction with the accompanying drawings.

In this respect, before explaining the current embodiments of the towable lawn tarp in detail, it is to be understood that the towable lawn tarp is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the towable lawn tarp.

It is therefore important that the claims be regarded as including such equivalent construction insofar as they do not depart from the spirit and scope of the towable lawn tarp. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a back view of an embodiment of the disclosure.

DETAILED DESCRIPTION OF THE EMBODIMENT

Figure 1:
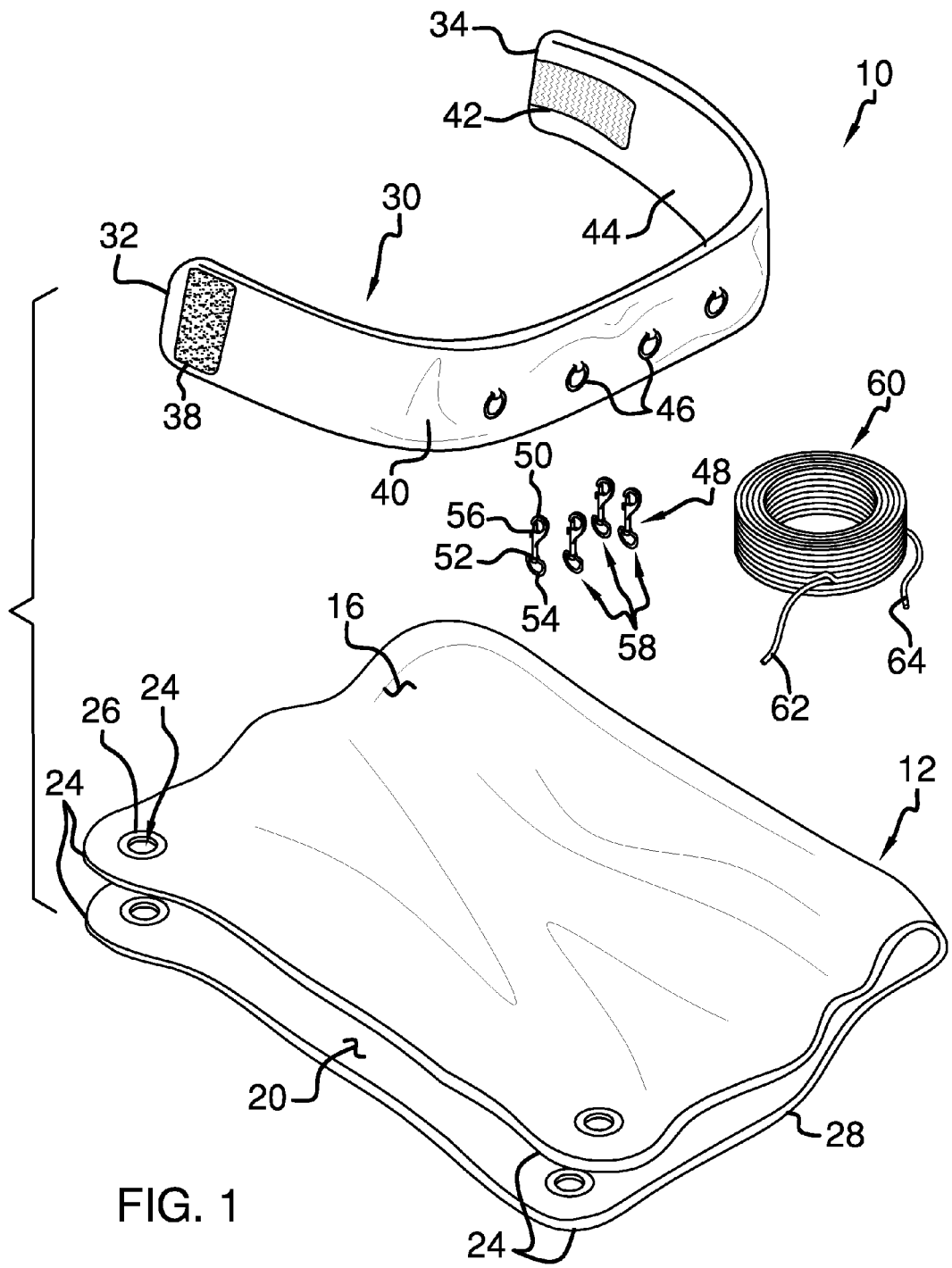
FIG. 1 is a perspective view of a transportation tarp assembly according to an embodiment of the disclosure.
Figure 4:
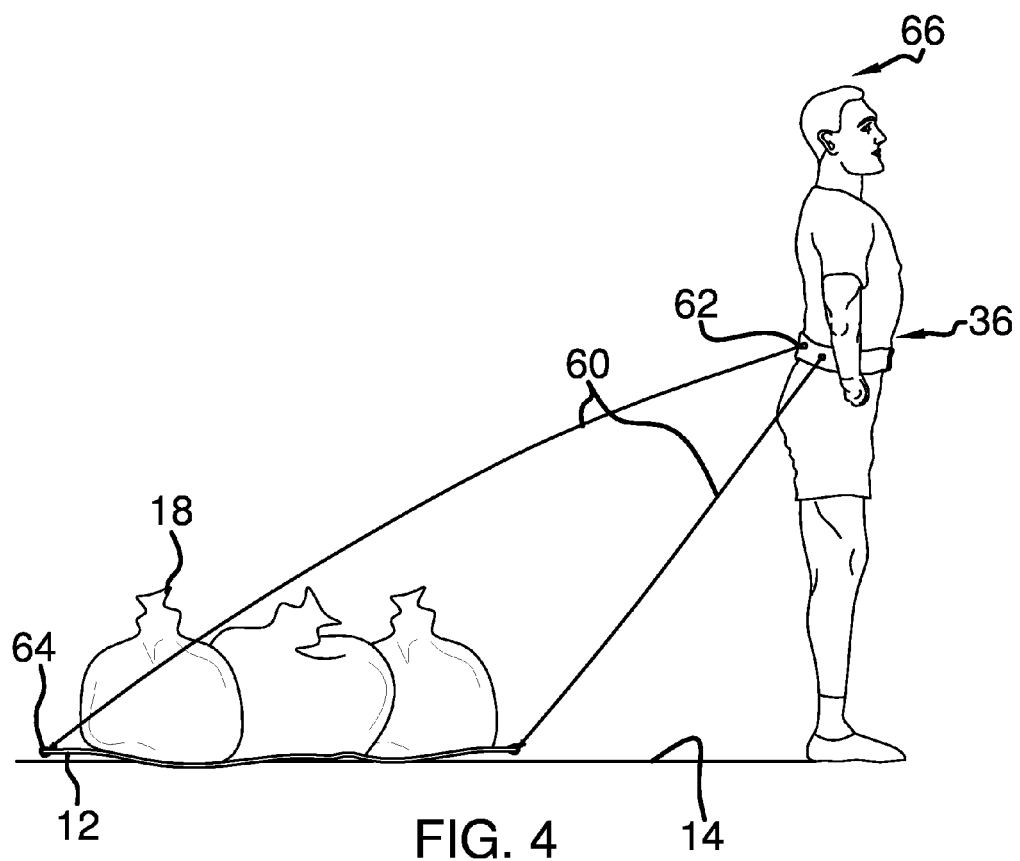
FIG. 4 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 5, the transportation tarp assembly 10 generally comprises a panel 12 that is positionable on a support surface 14 so a bottom surface 16 of the panel 12 abuts the support surface 14. The support surface 14 may be ground. An object 18 is positioned on a top surface 20 of the panel 12 after the panel 12 is positioned on the support surface 14. The panel 12 may be comprised of a deformable material and fluid resistant material.

The panel 12 has a plurality of rope apertures 22 extending through the top 20 and bottom 16 surfaces of the panel 12. Each of the plurality of rope apertures 22 is positioned proximate an associated one of four corners 24 of the panel 12. A plurality of grommets 26 is each coupled to the panel 12. The plurality of grommets 26 comprises a closed loop. Finally, each of the plurality of grommets 26 is coextensive with an outer edge 28 of each of the plurality of rope apertures 22.

A belt 30 is provided. The belt 30 has a first end 32 and a second end 34. Additionally, the belt 30 is elongated between the first 32 and second 34 ends of the belt 30. The belt 30 is worn about a user's waist 36.

A first coupler 38 is coupled to a back side 40 of the belt 30. The first coupler 38 is positioned proximate the first end 32 of the belt 30. A second coupler 42 is coupled to a front side 44 of the belt 30. The second coupler 42 is positioned proximate the second end 34 of the belt 30. Each of the first 38 and second 42 couplers may be complimentary hook and loop fasteners. The first 38 and second 42 couplers retain the belt 30 around the user's waist 36.

A plurality of rings 46 is coupled to the back side 40 of the belt 30. The plurality of rings 46 is evenly spaced apart. Moreover, the plurality of rings 46 is centrally positioned on the belt 30. Each of the plurality of rings 46 may have a diameter between 6 mm and 12 mm.

A clip 48 is provided. The clip 48 has a top end 50 and a bottom end 52. Additionally, the clip 48 is elongated between the top 50 and bottom ends 52 of the clip. A D-shaped ring 54 is movably coupled to the bottom end 52 of the clip 48. The top end 50 of the clip 48 comprises a closed loop.

A release 56 is operationally coupled to the top end 50 of the clip 48 so the top end 50 of the clip 48 may be selectively opened. The clip 48 is one of a plurality of the clips 58. The top end 50 of each of the plurality of clips 58 is removably coupled to an associated one of the plurality of rings 46.

A plurality of the ropes 60 is provided. A first end 62 of each of the plurality of ropes 60 is removably coupled to the D-shaped ring 54 on a selected one of the plurality of clips 58. A second end 64 of each of the plurality of ropes 60 is removably coupled to a selected one of the plurality of rope apertures 22 in the panel 12.

In use, the user 66 positions one or more of the objects 18 on the top surface 20 of the panel 12. Continuing, the user 66 removably couples the plurality of ropes 60 between the panel 12 and the belt 30. The user 66 places the belt 30 around the user's waist 36. The user 60 tows the objects 18 on the panel 12 by walking.

Figure 5:
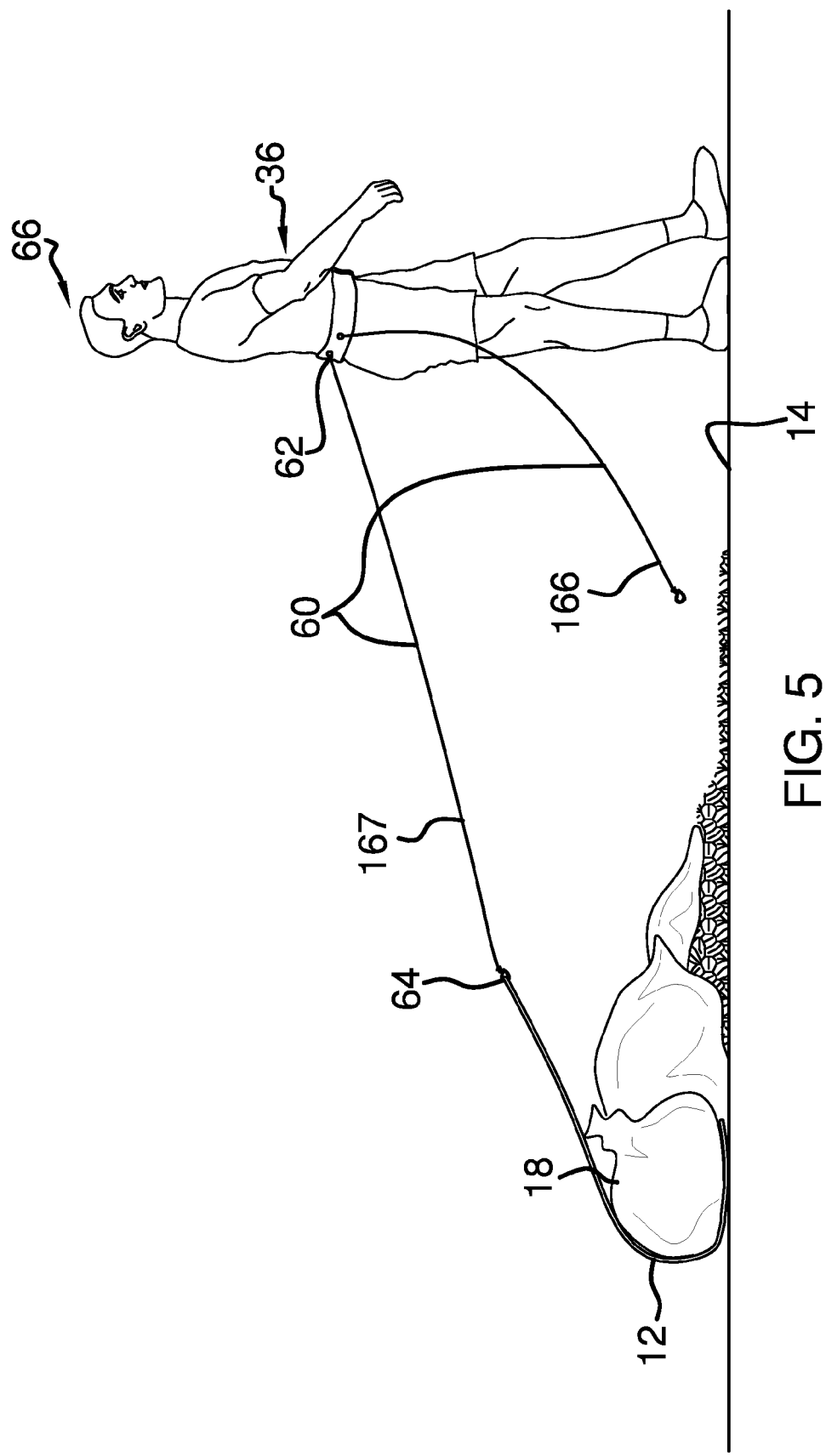
FIG. 5 is an in-use view of an embodiment of the disclosure.

Referring to FIG. 5, the ropes 60 are further classified as a forward rope 166 and a rearward rope 167. The user 60 drags the transportation tarp assembly 10 and objects 18 to an intended destination where the forward rope 166 is disconnected. Thereafter, the user 66 walks forward whilst the panel 12 flips over thereby dumping the object 18 at the intended destination.

With respect to the above description, it is to be realized that the optimum dimensional relationship for the various components of the transportation tarp assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the transportation tarp assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A transportation tarp assembly having objects placed thereon such that said assembly is towed by a user, said assembly comprising:
a panel being positionable on a support surface, the objects being positioned upon said panel;
a belt configured to be worn by the user;
a clip operationally coupled to said belt;
a plurality of ropes coupled between said clip and said panel such that the user tows the objects on said panel;
wherein said clip having a top end and a bottom end, said clip being elongated, each of said top and bottom ends of said clip comprising a closed loop;
said top end of said clip having a release thereon such that said top end of said clip may be selectively opened.

2. The assembly according to claim 1, wherein said panel being positionable on the support surface such that a bottom surface of said panel abuts the support surface.

3. The assembly according to claim 1, wherein said panel having a plurality of rope apertures extending through a top surface and a bottom surface of said panel.

4. The assembly according to claim 3, wherein each of said plurality of rope apertures being positioned proximate an associated one of four corners of said panel.

5. The assembly according to claim 1, wherein the objects being positioned on a top surface of said panel after said panel is positioned on the support surface.

6. The assembly according to claim 1, wherein said belt having a first end and a second end, said belt being elongated.

7. The assembly according to claim 1, wherein said belt being configured to be worn about the user's waist.

8. The assembly according to claim 1, wherein a plurality of rings coupled to a back side of said belt.

9. The assembly according to claim 8, wherein said plurality of rings being evenly spaced apart, said plurality of rings being centrally positioned on said belt.

10. The assembly according to claim 1, wherein said clip being one of a plurality of said clips.

11. The assembly according to claim 10, wherein a top end of each of said plurality of clips being removably coupled to an associated one of a plurality of rings.

12. The assembly according to claim 1, wherein the plurality of ropes are further classified as a forward rope and a rearward rope; said user drags the transportation tarp assembly and objects to an intended destination where the forward rope is disconnected; wherein the user walks forward whilst the panel flips over thereby dumping the object at the intended destination.

13. The assembly according to claim 12, wherein each of said plurality of ropes being removably coupled between a bottom end of a selected one of a plurality of said clips and a selected one of a plurality of rope apertures in said panel.

14. A transportation tarp assembly having objects placed thereon such that said assembly is towed by a user, said assembly comprising:
a panel being positionable on a support surface, the objects being positioned upon said panel;
a belt having a first end and a second end, said belt being elongated, said belt being configured to be worn by the user;
a clip operationally coupled to said belt;
ropes coupled between said clip and said panel such that the user tows the objects on said panel;
said ropes are further classified as a forward rope and a rearward rope; said user user drags the transportation tarp assembly and objects to an intended destination where the forward rope is disconnected from the panel, thereafter, said user walks forward whilst the panel flips over thereby dumping the object at the intended destination;
wherein said clip having a top end and a bottom end; said clip being elongated; each of said top and bottom ends of said clip comprising a closed loop; said top end of said clip having a release thereon such that said top end of said clip is selectively opened; said clip being one of a plurality of said clips; said top end of each of said plurality of clips being removably coupled to an associated one of a plurality of rings.

15. The assembly according to claim 14, wherein said panel being positionable on the support surface such that a bottom surface of said panel abuts the support surface; said panel having a plurality of rope apertures extending through a top surface and said bottom surface of said panel; each of said plurality of rope apertures being positioned proximate an associated one of four corners of said panel; the objects being positioned on a top surface of said panel after said panel is positioned on the support surface.

16. The assembly according to claim 14, wherein said belt being worn about the user's waist; a plurality of rings coupled to a back side of said belt; said plurality of rings being evenly spaced apart, said plurality of rings being centrally positioned on said belt.

17. The assembly according to claim 14, wherein said rope being one of a plurality of said ropes; each of said plurality of ropes being removably coupled between a bottom end of a selected one of a plurality of said clips and a selected one of a plurality of rope apertures in said panel.

* * * * *